(12) United States Patent
Friedman et al.

(10) Patent No.: US 11,846,201 B2
(45) Date of Patent: Dec. 19, 2023

(54) BALANCING WEIGHT ENTRY PORT FOR TURBINE ROTOR

(71) Applicant: General Electric Company, Schenectady, NY (US)

(72) Inventors: Michael Ericson Friedman, Simpsonville, SC (US); Gang Liu, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/657,409

(22) Filed: Mar. 31, 2022

(65) Prior Publication Data

US 2022/0220853 A1 Jul. 14, 2022

Related U.S. Application Data

(62) Division of application No. 17/022,393, filed on Sep. 16, 2020, now Pat. No. 11,377,955.

(51) Int. Cl.
*B23C 3/18* (2006.01)
*B23B 29/04* (2006.01)
(Continued)

(52) U.S. Cl.
CPC ............ *F01D 5/027* (2013.01); *B23B 29/043* (2013.01); *B23C 3/18* (2013.01); *B23C 5/00* (2013.01);
(Continued)

(58) Field of Classification Search
CPC ..... F01D 5/027; F01D 5/3038; B23B 29/043; B23C 3/18; B23C 5/00; B23C 5/12;
(Continued)

(56) References Cited

U.S. PATENT DOCUMENTS

| 4,255,086 A | 3/1981 | Roberts |
| 6,481,969 B2 | 11/2002 | Berry et al. |

(Continued)

FOREIGN PATENT DOCUMENTS

| EP | 2251529 A2 | 11/2010 |
| EP | 3587733 A1 | 1/2020 |

(Continued)

OTHER PUBLICATIONS

Non-Final Office Action from related U.S. Appl. No. 17/022,393 dated Sep. 23, 2021, 21 pages.

(Continued)

*Primary Examiner* — Lee A Holly
(74) *Attorney, Agent, or Firm* — James Pemrick; Charlotte Wilson; Hoffman Warnick LLC (57) ABSTRACT

A turbine rotor includes a rotor body and a balancing weight slot defined in an exterior circumference of the body. The balancing weight slot has a first axial width and a first radially outward facing surface at a first radial distance from a rotor axis. The rotor also includes a balancing weight entry port defined in a portion of the exterior circumference of the rotor body and aligned with the balancing weight slot. The balancing weight entry port has a second axial width greater than the first axial width and a second radially outward facing surface at a second radial distance from the axis of the rotor body that is smaller than the first radial distance. A method may include machining the entry port into the rotor with a tool. The method may be applied to a new rotor, or to remove cracks initiating from a previous entry port.

4 Claims, 9 Drawing Sheets

(51) Int. Cl.
   *B23C 5/00* (2006.01)
   *B23C 5/02* (2006.01)
   *F01D 5/02* (2006.01)
   *B23C 5/12* (2006.01)

(52) U.S. Cl.
   CPC ............ *B23C 5/12* (2013.01); *F05D 2220/32* (2013.01); *F05D 2230/10* (2013.01); *F05D 2240/24* (2013.01); *F05D 2260/96* (2013.01)

(58) Field of Classification Search
   CPC ............ F05D 2220/32; F05D 2230/10; F05D 2240/24; F05D 2260/96; F05D 2260/15; F05D 2260/34; F04D 29/321; F04D 19/02; F04D 29/662; F16F 15/34
   See application file for complete search history.

(56) References Cited

U.S. PATENT DOCUMENTS

| | | | |
|---|---|---|---|
| 7,690,111 | B2 | 4/2010 | Coffey et al. |
| 8,182,229 | B2 | 5/2012 | Rajarajan et al. |
| 8,245,375 | B2 | 8/2012 | Coffey et al. |
| 8,602,738 | B2 | 12/2013 | Rajarajan et al. |
| 9,163,513 | B2 | 10/2015 | Bestwick |
| 9,382,805 | B2 | 7/2016 | Shaw |
| 10,472,980 | B2 | 11/2019 | Itzel et al. |
| 2008/0181733 | A1* | 7/2008 | Wright ................ B23Q 9/0042 408/1 R |
| 2013/0051947 | A1* | 2/2013 | Holmes ................ F01D 5/005 29/889.1 |
| 2013/0319008 | A1 | 12/2013 | Faulder et al. |
| 2016/0097282 | A1* | 4/2016 | Clark .................. F01D 5/12 409/178 |
| 2016/0279718 | A1* | 9/2016 | Capriotti ................ B23C 3/28 |
| 2022/0082021 | A1 | 3/2022 | Friedman et al. |

FOREIGN PATENT DOCUMENTS

| | | |
|---|---|---|
| EP | 3611338 A2 | 2/2020 |
| JP | 2012093250 A | 5/2012 |

OTHER PUBLICATIONS

Notice of Allowance from related U.S. Appl. No. 17/022,393 dated Mar. 1, 2022, 13 pages.

European Search Report issued in connection with corresponding EP Application No. 21195389.8-1004, dated Feb. 17, 2022, 7 pages.

\* cited by examiner

BALANCING WEIGHT ENTRY PORT FOR TURBINE ROTOR

This Application is a Divisional Application of U.S. patent application Ser. No. 17/022,393 filed Sep. 16, 2020, now U.S. patent Ser. No. ______, of which the entire contents thereof are incorporated herein.

TECHNICAL FIELD

The disclosure relates generally to turbomachines, and more particularly, to a turbine rotor including a balancing weight entry port for introducing a weight into a balancing weight slot of the turbine rotor, a tool for making the port and a related method.

BACKGROUND

Certain rotating elements in industrial machines, such as turbine rotors, include balancing weights coupled in a circumferential slot on a circumferential exterior surface of the turbine rotor. The circumferential slot has a cross-sectional shape that includes retaining members, like tabs or ears, that retain one or more weights that have a similar cross-sectional shape. The circumferential slot can have, for example, a dovetail or trapezoidal cross-sectional shape. The weights can be slid along the slot to any circumferential position necessary to balance the turbine rotor, and are fastened in position. In order to introduce the weights to the slot, a balancing weight entry port having a larger axial extent than the slot is milled into the turbine rotor over the slot. The milling typically removes the retaining members of the slot, and provides a position in which the weights can be introduced circumferentially into the slot. One challenge with the balancing weight entry port is that milling of the retaining members of the slot to initially form the entry port can leave circumferentially extending portions (peaks) of the retaining members and sharp corners at the bottom of sidewalls of the port. Each of these structures can lead to the initiation of damage such as cracking in the turbine rotor. Repair of the damage without otherwise damaging the turbine rotor can be very difficult.

BRIEF DESCRIPTION

A first aspect of the disclosure provides a turbine rotor, comprising: a rotor body; a balancing weight slot defined in an exterior circumference of the rotor body, the balancing weight slot having a first axial width and a first radially outward facing surface at a first radial distance from an axis of the rotor body; and a balancing weight entry port defined in a portion of the exterior circumference of the rotor body and aligned with the balancing weight slot, the balancing weight entry port having a second axial width greater than the first axial width and a second radially outward facing surface at a second radial distance from the axis of the rotor body that is smaller than the first radial distance.

A second aspect of the disclosure provides a tool for forming a balancing weight entry port for a balancing weight slot of a rotor body of a turbine rotor, the tool comprising: a motorized machining head; a clamp system configured to couple the motorized machining head to at least a portion of a merge joint flange of the rotor body; a head circumferential positioning system configured to position the motorized machining head in a selected one of a plurality of circumferential positions relative to the balancing weight slot of the rotor body; and a head radial positioning system configured to move the motorized machining head radially relative to the balancing weight slot on the rotor body at each of the plurality of circumferential positions to machine the rotor body, modifying the balancing weight slot.

A third aspect of the disclosure provides a method of forming a balancing weight entry port for a balancing weight slot defined in a rotor body of a turbine rotor and extending circumferentially about the rotor body, the method comprising: performing a first plunge machining radially partially into the rotor body, modifying the balancing weight slot at a first circumferential position; and performing one of: a) a circumferential translation after the first plunge machining, and b) performing a second plunge machining radially partially into the rotor body, modifying the balancing weight slot at a second circumferential position different than the first circumferential position, wherein an opening created by the second plunge machining is co-extensive with an opening created by the first plunge machining; and performing a third plunge machining radially partially into the rotor body, modifying the balancing weight slot at a third circumferential position different than the first and second circumferential positions, wherein an opening created by the third plunge machining is co-extensive with openings created by the first and second plunge machining, wherein each plunge machining and the circumferential translation removes a portion of the rotor body within or adjacent the balancing weight slot.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow (i.e., the direction from which the flow originates). The terms "forward" and "aft," without any further specificity, refer to directions, with "forward" referring to the front or compressor end of the engine, and "aft" referring to the rearward section of the turbomachine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis, e.g., of a turbine rotor. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify position or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs, or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
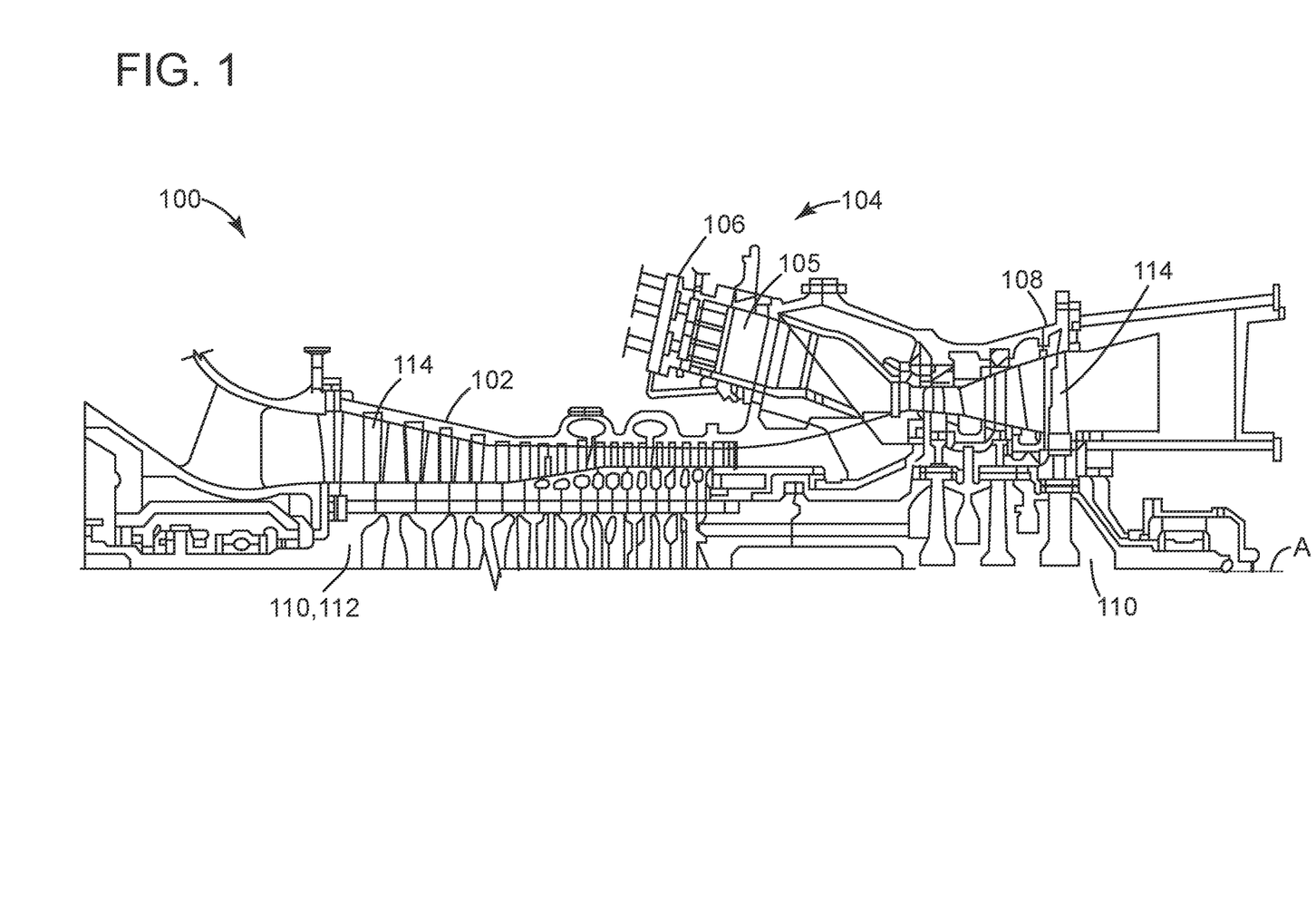
FIG. 1 is a schematic illustration of an illustrative gas turbine system.

FIG. 1 is a schematic illustration of an illustrative turbomachine in which a turbine rotor 110, according to embodiments of the disclosure, may be employed. Here, the turbomachine includes a gas turbine (GT) system 100. GT system 100 includes a compressor 102 and a combustor 104. Combustor 104 includes a combustion region 105 and a fuel nozzle assembly 106. GT system 100 also includes a turbine 108 and a common turbine rotor 110. In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 for which gas stream thermal energy is converted to mechanical rotational energy. Turbine 108 includes a number of stages of rotatable blades coupled to the turbine rotor 110, and rotatably drives turbine rotor 110. Compressor 102 also is rotatably coupled to turbine rotor 110. The present disclosure is not limited to any one particular GT system and may be used in connection with any GT system including, for example, any HA, F, B, LM, GT, TM and E-class engine models of General Electric Company, Greenville, S.C., and engine models of other companies. Further, the teachings of the disclosure are not limited to turbomachines in the form of gas turbine systems, and can be applied to any rotating element or rotor that includes a balancing slot and requires balancing.

Figure 2:
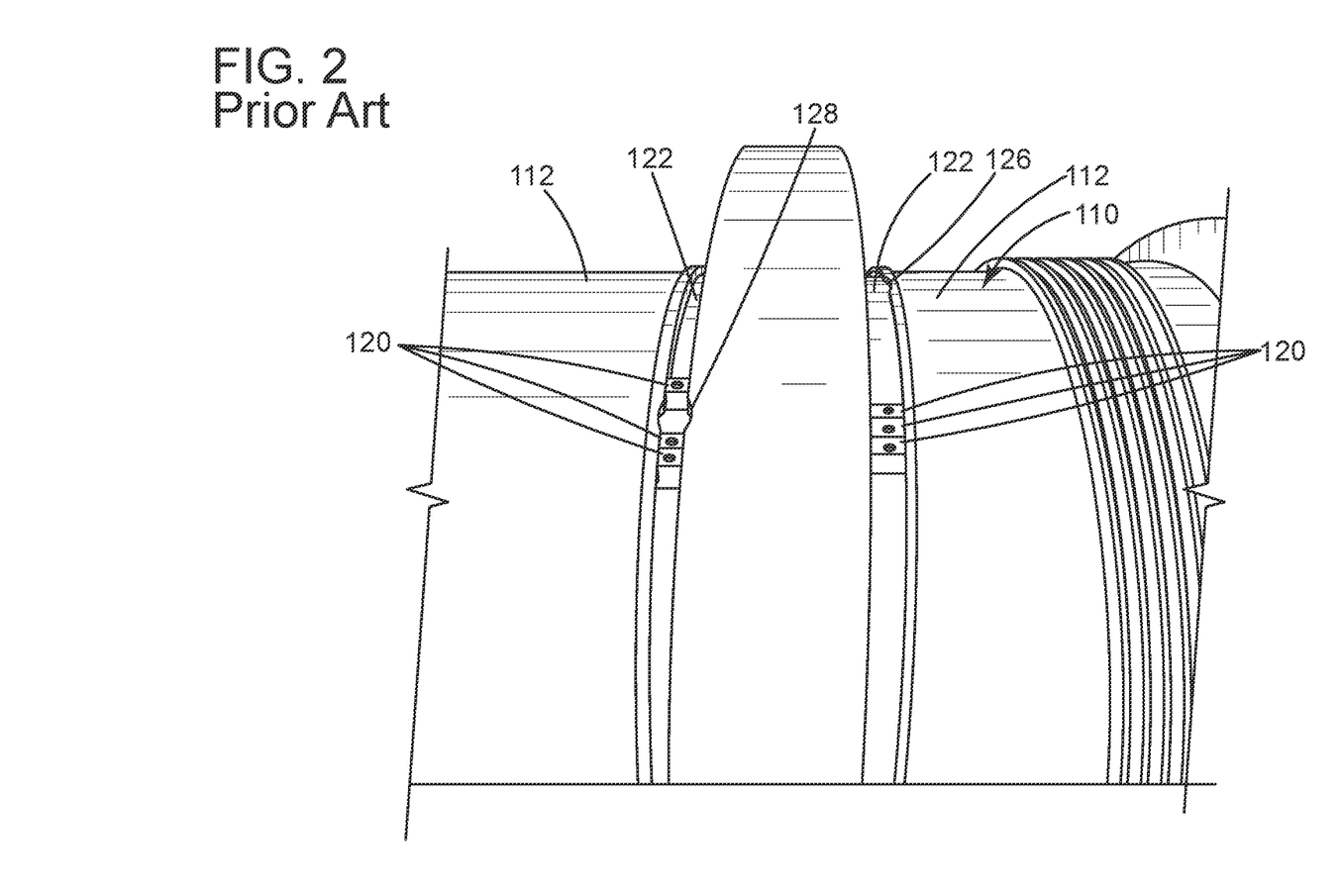
FIG. 2 is a side perspective view of a turbine rotor, according to the prior art.

FIG. 2 shows a side view of turbine rotor 110 with any turbine blades/stages removed therefrom. Turbine rotor 110 may include a rotor body 112 in the form of a generally cylindrical shaft, which may have a number of blade stages 114 (FIG. 1 only) (for compressor 102 and/or turbine 108) coupled thereto. Turbine rotor 110 may exhibit asymmetries in its mass distribution, i.e., imbalances. The imbalances may cause turbine rotor 110 to experience periodic forces and torques such as vertical and lateral vibrations, which may also cause the rotor to oscillate during use—similar to an unbalanced tire on a motor vehicle. To address this situation, as shown in FIG. 2 and the enlarged perspective view of FIG. 3, one or more balancing weights 120 are coupled at one or more circumferential positions in a circumferentially extending, balancing weight slot 122 (two shown in FIG. 2) in rotor body 112 of turbine rotor 110 to balance the rotor, and allow it to rotate without oscillation. As shown in one example in the cross-sectional view of FIG. 4, balancing weight slot(s) 122 and balancing weight(s) 120 are complementarily configured to retain the balancing weights in the slot. For example, balancing weight slot 122 and balancing weight 120 may have complementary cross-sectional shapes configured to retain balancing weights 120 therein. In one non-limiting example, shown in FIG. 4, balancing weights 120 and balancing weight slot 122 have complementary trapezoidal cross-sectional shapes. Here, balancing weight slot 122 includes opposing retaining members 124 in the form of ears or tabs. A fastener 125 such as a set screw may be used to lock balancing weights 120 in position.

In order for balancing weight(s) 120 to be introduced into balancing weight slot 122, rotor body 112 includes one or more balancing weight entry ports 126. Each balancing weight entry port 126 includes an axially enlarged area of balancing weight slot 122 in which balancing weights 120 can be positioned in, and circumferentially slid into, the slot. As shown in the enlarged perspective view of FIG. 3, a balancing weight entry port 126 may be formed, e.g., by machining retaining members 124 from slot 122, creating port 126 but leaving peaks 128. During use, the peaks and/or sharp corners 130 where a vertical sidewall 132 of port 126 meets a radially outward facing surface 134 of slot 122 (sharp corners—with a radius of less than 0.76 mm), can crack. The cracks can propagate in rotor body 112. Accordingly, the peaks and sharp corners should be avoided during initial manufacture, and may need to be removed during servicing.

As indicated above, the disclosure provides a turbine rotor including a rotor body, and a balancing weight slot defined in an exterior circumference of the body. The balancing weight slot has a first axial width and a first radially outward facing surface at a first radial distance from an axis of the rotor. The rotor also includes a balancing weight entry port defined in a portion of the exterior circumference of the rotor body and substantially aligned with the balancing weight slot. The balancing weight entry port has a second axial width greater than the first axial width. The balancing weight slot also has a second radially outward facing surface at a second radial distance from the axis of the rotor body that is smaller than the first radial distance, meaning the entry port extends farther into the rotor body than the slot. Embodiments of the disclosure also include a method and a tool for forming the entry port into the rotor body. The tool can be used to perform a series of plunge machining steps to create the new balancing weight entry port. The method may be applied to a new rotor, or a used rotor to remove peaks 128 (FIG. 3) and/or sharp corners 130 (FIG. 3) initiating from a previously formed entry port that may include cracks or other damage. The new balancing weight entry port has rounded corners to forestall new cracks.

Figure 5:
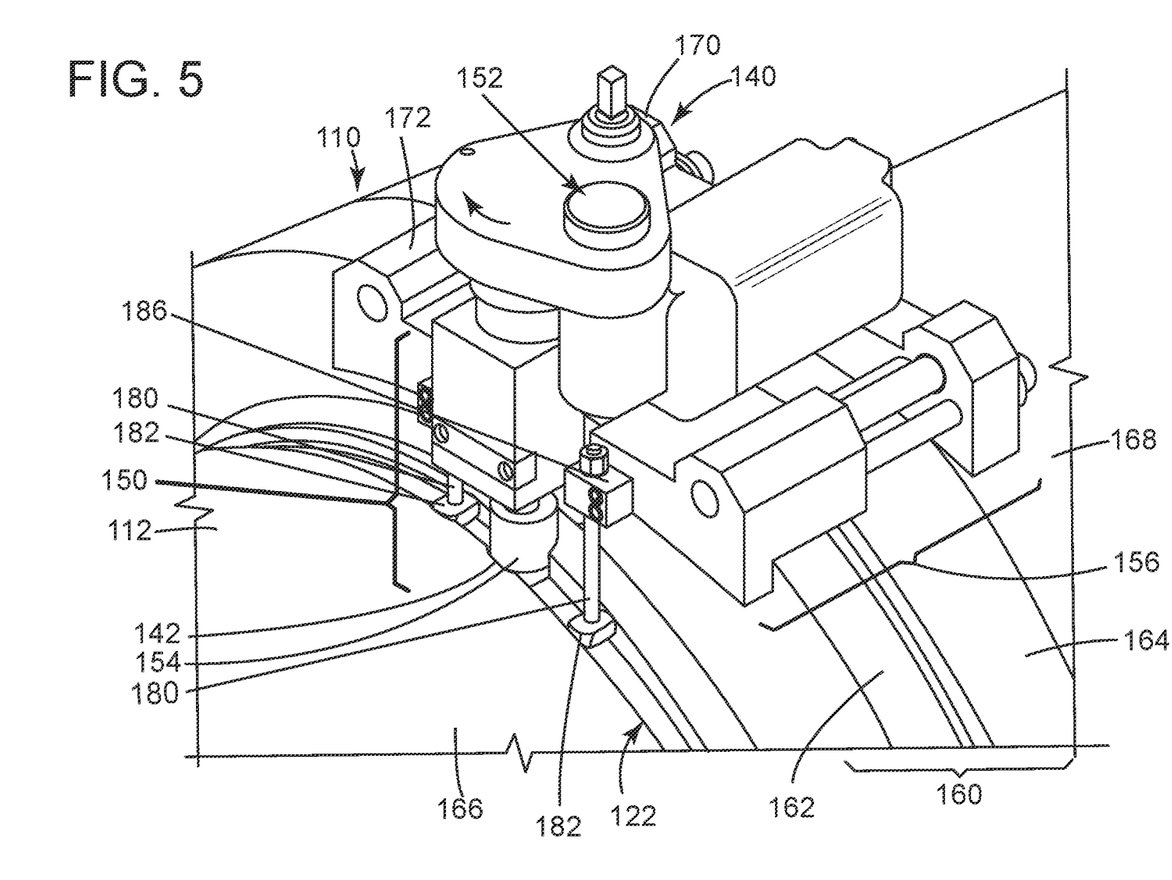
FIG. 5 is a front perspective view of a tool positioned on a rotor body for forming a balancing weight entry port, according to embodiments of the disclosure.
Figure 6:
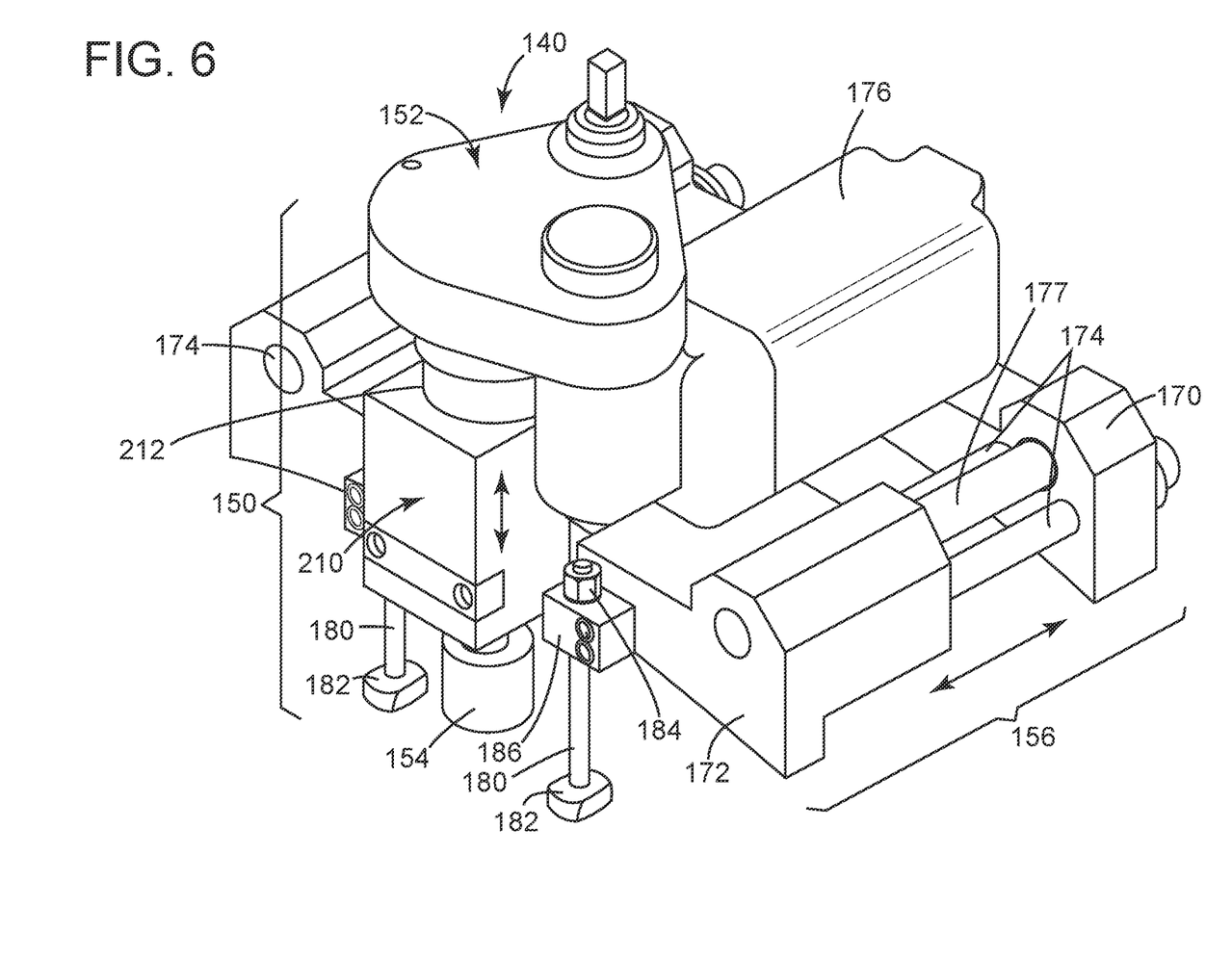
FIG. 6 is a front perspective view of a tool for forming a balancing weight entry port, according to embodiments of the disclosure.

Referring to FIGS. 5-12, a method and a tool for carrying out the method, according to embodiments of the disclosure, will be described. FIGS. 5 and 6 show front perspective views of a tool 140 for forming a balancing weight entry port 142 for balancing weight slot 122 of rotor body 112 of turbine rotor 110. FIG. 5 shows tool 140 in position on rotor body 112, and FIG. 6 shows tool 140 apart from rotor body 112. Tool 140 includes a motorized machining head 150. Motorized machining head 150 may include any now known or later developed rotary actuator 152 capable of rotating a machining element 154, e.g., an electric, pneumatic, or hydraulic motor. In certain embodiments, motorized machining head 150 may also be capable of a single plunge machining with a controlled and limited amount of circumferential translation, thus reducing the number of plunge machining steps required. Machining element 154 will be described herein. Tool 140 also includes a clamp system 156 configured to couple motorized machining head 150 to at least a portion of a merge joint flange 160 of rotor body 112. As illustrated, merge joint flange 160 may include axially coupled, radially extending merge joint flanges 162, 164 of two axially coupled portions 166, 168 of rotor body 112. Clamp system 156 may however couple to one or both flanges 162, 164 depending on the disposition of rotor body 112. For example, where rotor body 112 is separated into portions 166, 168, clamp system 156 may couple to only one of flanges 162, 164. Clamp system 156 may include any now known or later developed system for temporarily affixing motorized machining head 150 to rotor body 112. In the non-limiting example shown, clamp system 156 includes a first clamp member 170 movably coupled to a second clamp member 172 with one or more guide rails 174 perhaps directing axial movement of the members. Clamp system 156 may also include an actuator 176, e.g., a manual crank or motorized actuator (shown), for axially moving clamp members 170, 172 toward or away from one another. Actuator 176 may include, for example, a motorized worm gear 177 that threadably couples to member 170, 172, and can be rotated to change the axial positions of the members. A large variety of alternative actuators 176 could also be employed, e.g., linear rams, etc. Actuator 176 can be operated to have clamp members 170, 172 clamp motorized machining head 150 in position on one or both flanges 162, 164 of merge joint flange 160 for machining of rotor body 112, and can similarly be actuated to release motorized machining head 150 from rotor body 112. Clamp members 170, 172 may include any structure to assist in grasping merge joint flanges 162, 164, e.g., rough surfaces, locking features, etc.

Figure 3:
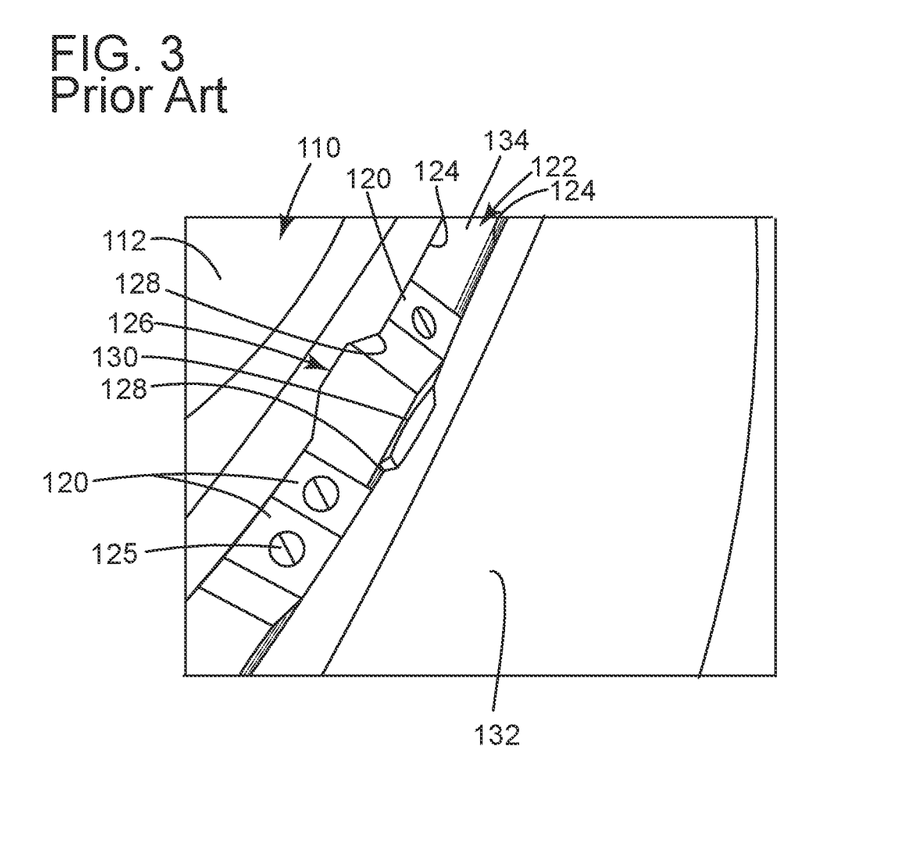
FIG. 3 is an enlarged perspective view of a balancing weight entry port and a balancing weight slot, according to the prior art.
Figure 4:
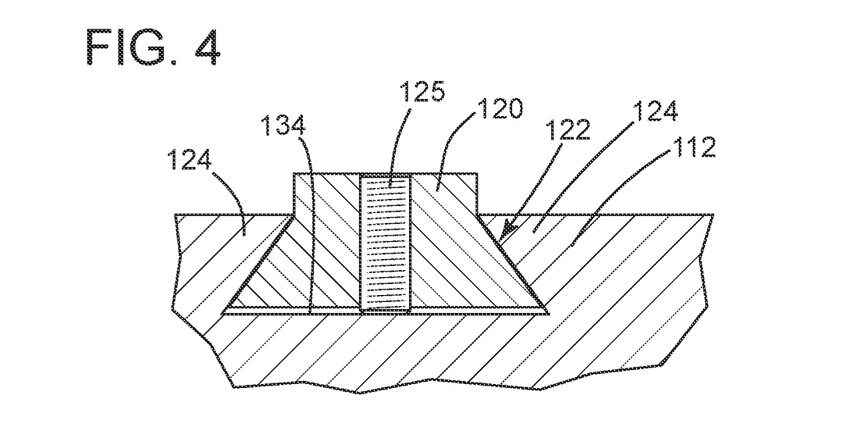
FIG. 4 is a cross-sectional view of an illustrative configuration of a balancing weight in a balancing weight slot.

Tool 140 may also optionally include at least one tie-down member 180 having a first end 182 configured to mount in balancing weight slot 122 and a second end 184 coupled to clamp system 156. First end 182 may have any shape configured to be positioned and retained in slot 122, similarly to balancing weights 120 (FIG. 4), e.g., trapezoidal for trapezoidal slot. For example, first end 182 may be sized and shaped to enter slot 122 and be turned so as to be retained therein, or it may be sized and shaped to enter slot 122 using balancing weight entry port 126 (FIG. 3). Second end 184 may include any mechanism to couple to clamp system 156. As illustrated, second end 184 may include an adjuster 186 therewith to adjust the radial position of first end 182 thereof; however, adjuster 186 may not be necessary in all cases. Adjuster 186 may include any now known or later developed mechanism to linearly change the position of first end 182 relative to clamp system 156, e.g., a threaded end and fastener, a clamp, etc. One or more tie downs 180 may be employed.

Figure 7:
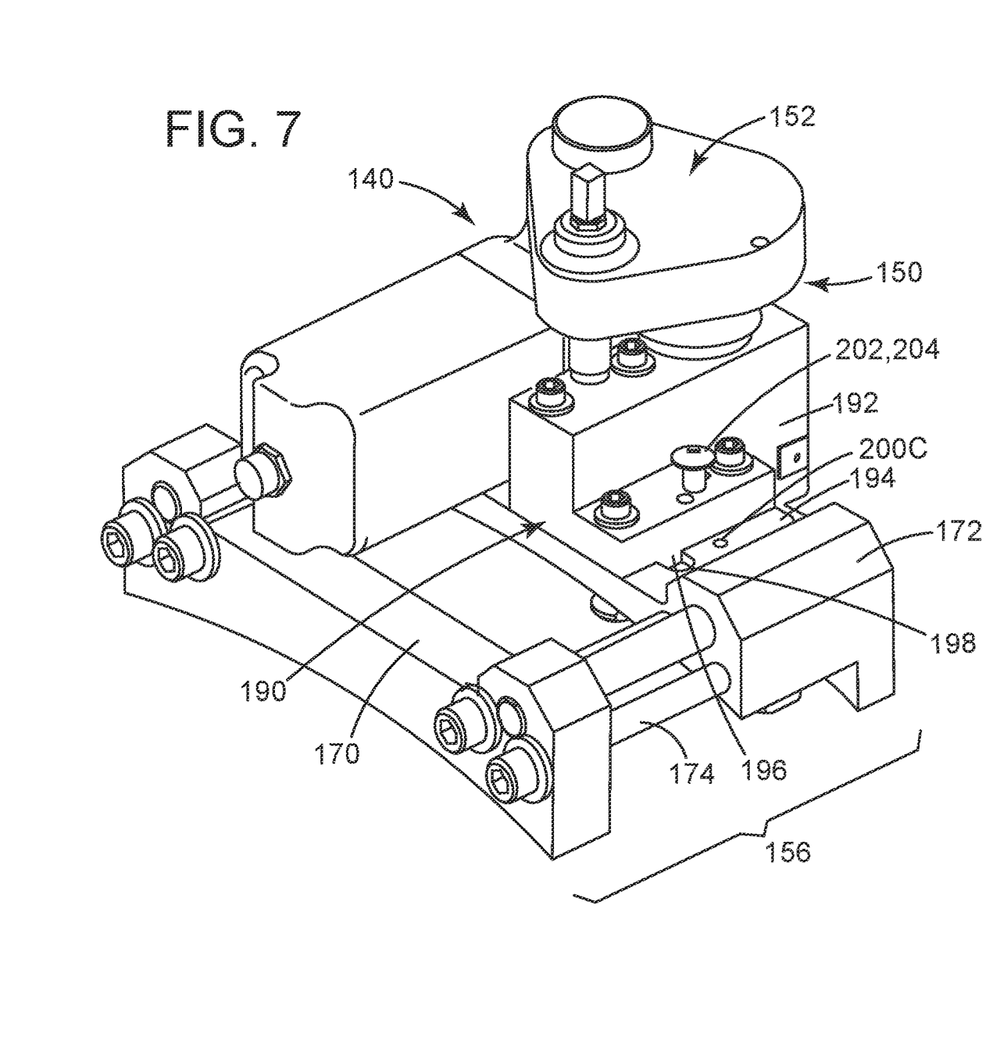
FIG. 7 is a rear perspective view of a tool for forming a balancing weight entry port, according to embodiments of the disclosure.
Figure 8:
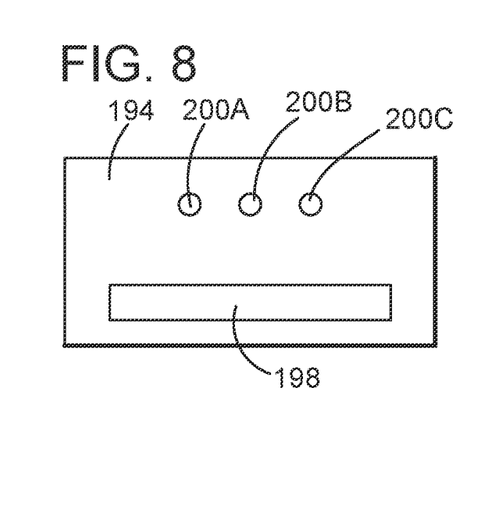
FIG. 8 is a top down view of a member of a head circumferential positioning system, according to embodiments of the disclosure.

FIG. 7 shows a rear perspective view of certain embodiments of tool 140. As shown best in FIG. 7, tool 140 also includes a head circumferential positioning system 190 configured to position motorized machining head 150 in one of the circumferential positions relative to the balancing weight slot 122 of rotor body 112, and circumferentially translate motorized machining head 150 relative to balancing weight slot 122 of the rotor body 112. Head circumferential positioning system 190 may take any form of structure capable of adjusting the circumferential position of motorized machining head 150, e.g., linear actuator, mechanical adjustment system, etc. In one example shown in FIG. 7, positioning system 190 may include a first member 192 fixedly coupled to motorized machining head 150, e.g., some part of the head, and a second member 194 fixedly coupled to clamp system 156. Second member 194, as illustrated, may be part of clamp system 156, e.g., clamp member 172, or it may be a separate element coupled to clamp system 156. FIG. 8 shows a top down view of second member 194. First member 192 and second member 194 are slidably coupled. In one non-limiting example, first member 192 may include a projection 196 that slidably rides in a slot 198 in second member 194. Other arrangements may also be possible, e.g., guide rails, etc.

As illustrated best in FIG. 8, second member 194 may include a position selecting member 200A-C for each of the plurality of circumferential positions. The number of possible circumferential positions provided relative to balancing weight slot 122 of rotor body 112 may be user defined depending on the circumferential extent of the desire balancing weight entry port 142. In certain embodiments, however, at least three positions are possible. First member 192 also may also include a position selector 202 configured for selectively positioning in a selected one of position selecting members 200A-C of second member 194 to position motorized machining head 150 in the selected one of the plurality of circumferential positions relative to balancing weight slot 122 of rotor body 112. In one non-limiting example, position selector 202 may include a pin 204 extending through first member 192 and seatable in one of position selecting members 200A-C. Position selecting member 200A-C may include openings in second member 194 and may be spaced to create the desired circumferential positions of the head. As will be described further, position selecting members 200A-C may be spaced at any distance necessary to ensure new entry port 142 circumferentially removes the original entry port using the position selecting members. In an alternative embodiment, position selector 202 may be omitted, and motorized machining head 150 may be capable of a single plunge machining with a controlled and limited amount of circumferential translation dictated by a length of slot 198, thus reducing the number of plunge machining steps required. Here, machining element 154 may be plunged once and then circumferentially translated as projection 196 of first member 192 slidably rides in slot 198 in second member 194, to provide a limited and controlled circumferential movement of machining element 154 to create entry port 142.

Referring to FIGS. 5 and 6, tool 140 also includes a head radial positioning system 210 configured to move motorized machining head 150 radially relative to balancing weight slot 122 on rotor body 112 (vertically as shown on page). The radial movement can be carried out at each of the plurality of circumferential positions to machine rotor body 112, modifying balancing weight slot 122 (FIG. 3), and creating balancing weight entry port 142. Head radial positioning system 210 may include any form of a linear actuator 212, e.g., manual crank, an electric, pneumatic, or hydraulic ram. Head radial positioning system 210 is fixed to clamp system 156.

Figures 9, 11:
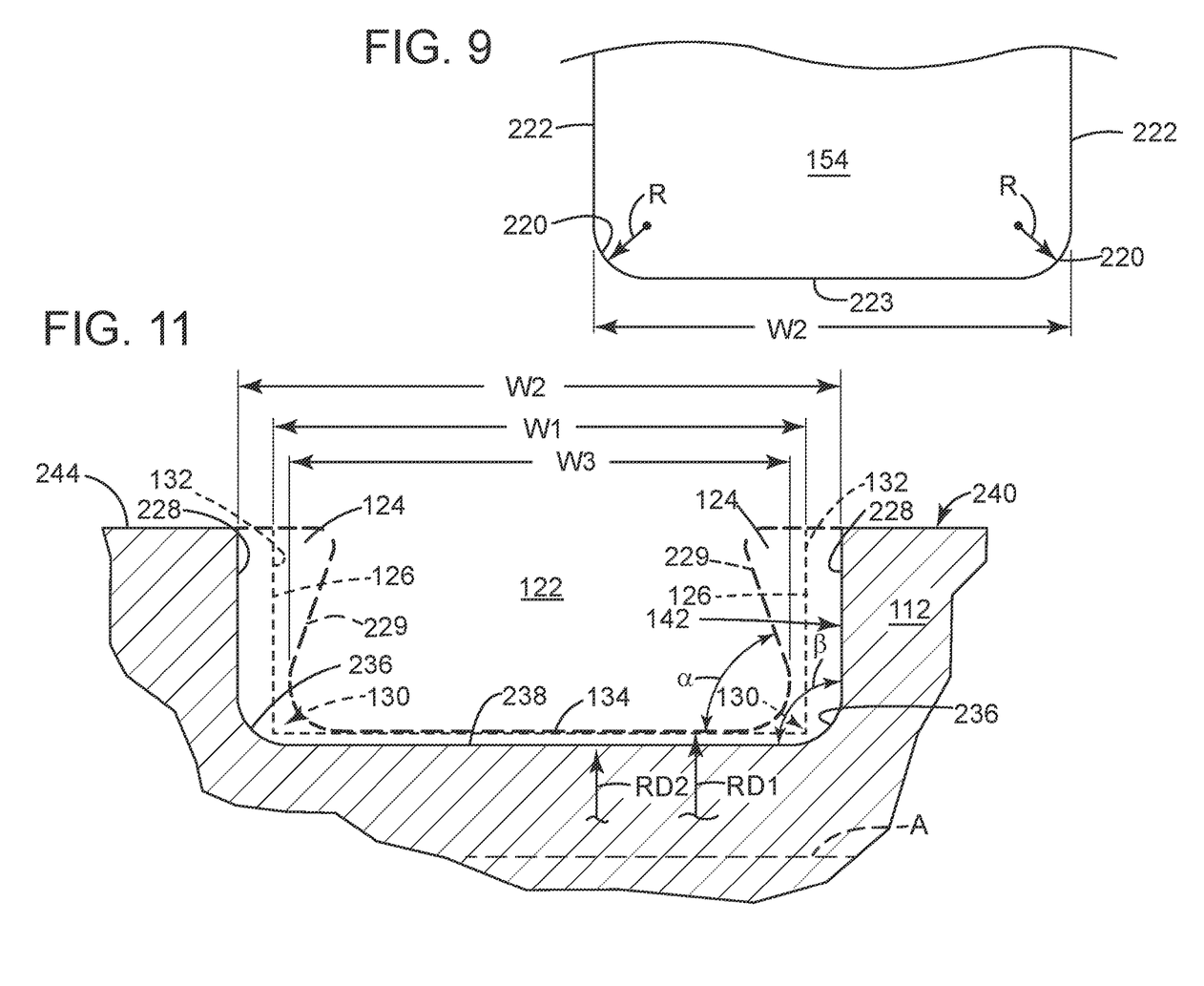
FIG. 9 is a cross-sectional view of a machining head for machining a balancing weight entry port, according to embodiments of the disclosure.
FIG. 11 is a schematic cross-sectional view of machining a balancing weight slot to form a balancing weight entry port, according to embodiments of the disclosure.

Machining element 154 is configured to form balancing weight entry port 142 in rotor body 112 relative to balancing weight slot 122. Machining element 154 may be used to form balancing weight entry port 142 in a slot during manufacture of rotor body 112. Alternatively, machining element 154 may be used to replace and repair a previously formed balancing weight entry port 126 (FIG. 3). In the latter case, machining element 154 is sized larger than the previously formed balancing weight entry port 126 (FIG. 3) so as to remove additional axial portions of rotor body 112 and remove any damage such as cracks or other damage in peaks 128 or sharp corner(s) 130. Machining element 154 may include any form of rotary machining element capable of forming the structure described herein. In non-limiting examples, machining element 154 may include a milling head, drill bit, grinding head, etc. FIG. 9 shows a cross-sectional view of an illustrative machining element 154 according to embodiments of the disclosure. Machining element 154 may have a circular cross-section (see e.g., FIG. 5) with rounded corners 220 between radial sidewalls 222 and a machining face 223. Rounded corners 220 are configured to create rounded corners 236 (FIG. 11) (fillet) for balancing weight entry port 142, i.e., between a radially outward facing surface 232 (FIG. 11) and sidewalls 228 (FIG. 11) thereof. The radius may be user defined to remove any damage such as cracking present, and/or to prevent any additional cracking. In certain illustrative embodiments, rounded corners 220 may have a radius R in a range of 1.250 millimeters (mm) to 5.080 mm. Other ranges may also be possible depending, for example, on the size of rotor body 112 and slot 122.

Figure 10:
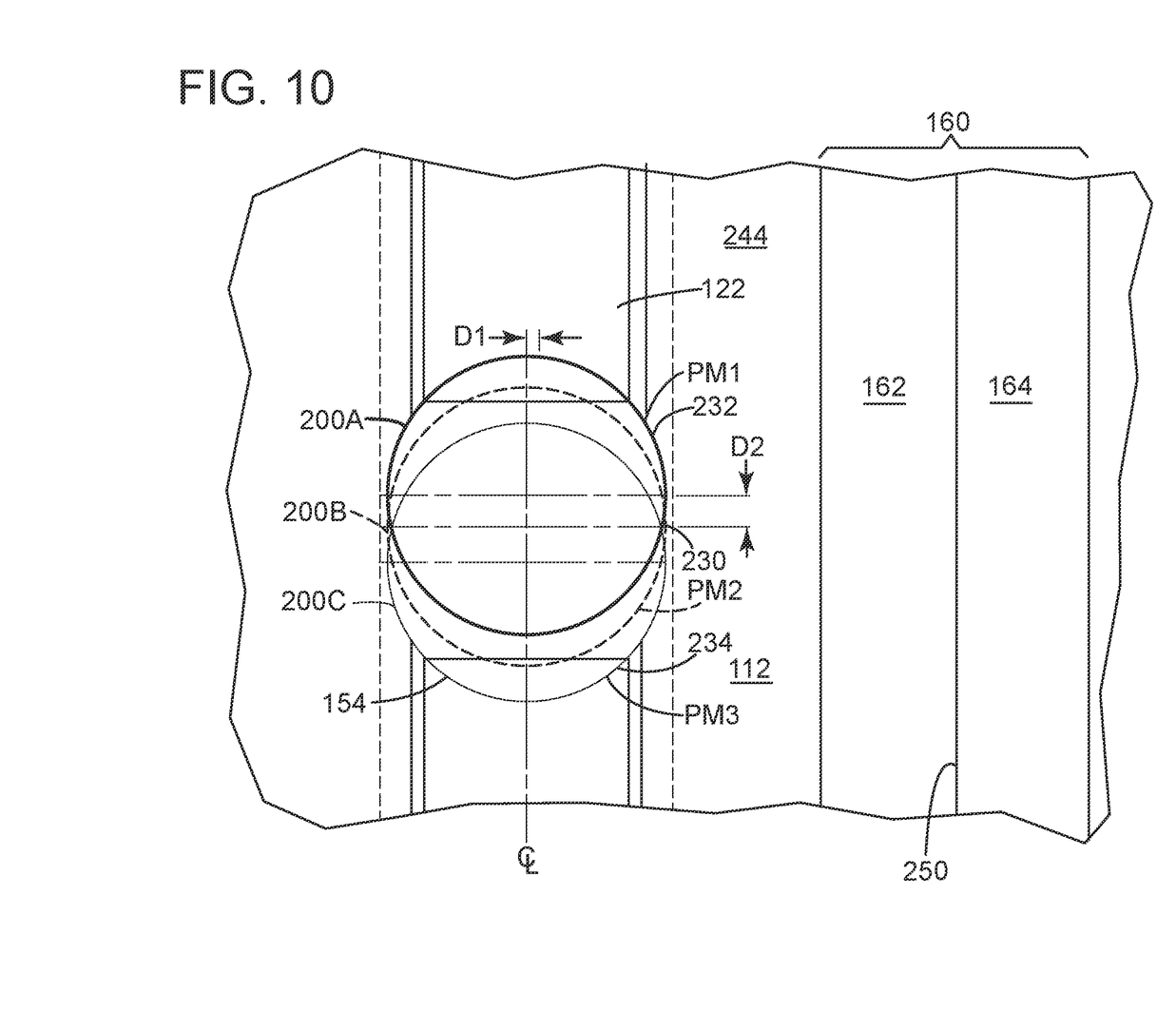
FIG. 10 is a schematic top down view of a rotor body and balancing weight slot with machining steps illustrated by circles representative of a machining head, according to embodiments of the disclosure.

Tool 140 may be used to form balancing weight entry port 142 for balancing weight slot 122 defined in rotor body 112 of turbine rotor 110, in accordance with embodiments of a method of the disclosure. FIG. 10 shows a schematic top down view of rotor body 112 and slot 122 with machining steps illustrated by circles representative of machining element 154. FIG. 11 shows a schematic cross-sectional of the machining of balancing weight slot 122, according to various embodiments. For reference purposes, FIG. 11 shows a remaining circumferential face of retaining members 124 of slot 122. As will be recognized, machining element 154 may be used to create balancing weight entry port 142 according to embodiments of the disclosure by removing, among other structure(s), retaining members 124 of slot 122 at any desired circumferential location (into or out of page). FIG. 11 also shows a previously existing balancing weight entry port 226 in phantom, including sidewalls 132 meeting at sharp corners 130 with a first radially outward facing surface 134 of balancing weight slot 122. As will be described, tool 140 may be used to expand previously formed balancing weight entry port 126 to create new entry port 142. In one non-limiting example, new entry port 142 may be 0.050 mm to 2.540 mm larger on each side; other ranges may also be possible depending on size of rotor body 112 and/or slot 122.

In operation, tool 140 is positioned on rotor body 112 in a desired circumferential position to create balancing weight entry port 142 by clamping to one or more flanges 162, 164, i.e., either for a new port or to replace an existing port 126 (FIG. 3). Head circumferential positioning system 190 is set in a first circumferential position, e.g., 200A, as described. Head radial positioning system 210 is used to perform a number of plunge machinings to create balancing weight entry port 142. Each machining uses circular machining element 154. For purposes of description, and as noted, embodiments of the description use three circumferentially spaced positions 200A-C to perform three machining steps PM1-PM3 (FIG. 10) to create entry port 142; however, more or less than three may be employed. (Note, second plunge machining PM2 is shown in phantom in FIG. 10 for differentiation purposes with the other machinings PM1, PM3). As shown in FIGS. 5 and 10, tool 140 may be coupled to one or more flanges 162, 164 such that each machining element 154 is positioned axially relative to rotor body 112 (e.g., by clamp system 156) in a range of 0 millimeters (mm) to 0.762 mm from a center (CL) of balancing weight slot 122. It is noted that other ranges may be possible depending on size of rotor body 112 and/or slot 122.

As shown in FIG. 10, head radial positioning system 210 is used to perform a first plunge machining PM1 radially and partially into rotor body 112, modifying balancing weight slot 122 at first circumferential position 200A. Head circumferential positioning system 190 is set in a second circumferential position, e.g., 200B, by position selector 202 (FIG. 7). Head radial positioning system 210 is used to perform a second plunge machining PM2 radially and partially into rotor body 112, again modifying balancing weight slot 122, at second circumferential position 200B. As noted, second circumferential position 200B is different than first circumferential position 200A. An opening 230 created by second plunge machining PM2 is co-extensive with an opening 232 created by first plunge machining PM1. Next, head circumferential positioning system 190 is set in a third circumferential position, e.g., 200C, by position selector 202 (FIG. 7). Head radial positioning system 210 is used to perform a third plunge machining PM2 radially and partially into rotor body 112, again modifying balancing weight slot 122, at third circumferential position 200C. As noted, third circumferential position 200C is different than first and second circumferential positions 200A, 200B. An opening 234 created by third plunge machining PM2 is co-extensive with openings 230, 232 created by first and second plunge machinings PM1, PM2. Each machining, i.e., each circumferential position 200A-C, may be circumferentially spaced any desired and/or necessary distance from a center of an adjacent machining to collectively create an entry port 142 with the desired circumferential extent, e.g., to completely remove the circumferential extent of the original entry port. As illustrated, each plunge machining PM1-PM3 removes a portion of rotor body 112 within or adjacent balancing weight slot 122, e.g., retain members 124 and parts of sidewalls 229 of the slot and/or previous slot 126. As noted, in other embodiments, motorized machining head 150 may be capable of a single plunge machining with a controlled and limited amount of circumferential translation, thus reducing the number of plunge machining steps required. In this case, a single plunge machining may be completed with a circumferential translation of machining element 154 to create the enlarged circumferential entry port 142. Here, position selector 202 may be omitted, as described. In any event, once complete, any tie-downs 180 may be loosened and removed, and clamp system 156 may be loosened so tool 140 can removed from flange(s) 162, 164.

Where used to repair a previously existing balancing weight entry port 126 (FIGS. 3 and 11), the method may include mounting tool 140 using clamp system 156 to at least a portion of merge joint flange 160, i.e., one or both flanges 162, 164, of a used rotor body 112 that includes a previously existing (first) balancing weight entry port 126 (FIGS. 3 and 11) for balancing weight slot 122. Advantageously, tool 140 may be used anywhere within a field of use, even with turbine rotor 110 in place in a power plant with a casing removed. The method may include performing a one or more plunge machinings, e.g., first, second and third plunge machinings PM1-PM3, to modify rotor body 112 to create new (second) balancing weight entry port 142 for balancing weight slot 122 in the same circumferential position as the previously existing balancing weight entry port 126. Here, previously existing balancing weight entry port 126 has a first axial width W1 (FIG. 11), and new balancing weight entry port 142 has a second axial width W2 greater than first axial width W1. That is, machining element 154 is wider than first axial width W1. Second axial width W2 may be defined by new sidewalls 228 of new entry port 142.

The plunge machining(s), regardless of whether for a new or used rotor body 112, also extend into balancing weight slot 122 beyond a first radially outward facing surface 134 thereof, creating a new radially outward facing surface 232. Consequently, as shown in FIG. 11, balancing weight slot 122 has first radially outward facing surface 134 at a first radial distance RD1 from an axis A (see also, FIG. 1) of rotor body 112, and entry port 142 with a second radially outward facing surface 238 at a second radial distance RD2 from axis A of rotor body 112 that is smaller than first radial distance RD1. For repair purposes, the deeper radially outward facing surface 232 ensures complete removal of damage such as cracks. A difference between first radial distance RD1 from axis A of rotor body 112 and second radial distance RD2 from axis A of rotor body 112 may be in a range of 0.254 millimeters (mm) to 2.286 mm; however, the range may vary depending on, for example, the extent of damage to be removed in a pre-existing entry port 126. It is noted that balancing weight slot 122 includes sidewalls 229 (formed with retaining members 124) extending from slot (first) radially outward facing surface 134 that may be at a non-perpendicular angle α, and new balancing weight entry port 142 has sidewalls 228 extend from new (second) radially outward facing surface 232 at a perpendicular angle (3. Machining element 154 however creates rounded corners 236 coupling new radially outward facing surface 232 and sidewalls 228 of new balancing weight entry port 142. That is, the machining removes sharp corners 130 and sidewalls 132, and also any existing peaks 128 (FIG. 3), of previously existing balancing weight entry port 126 that may include cracks or other damage. Sidewall 228 are increased in an axial dimension by machining element 154. Each sidewall 228 can be increased by as much as 25.4 millimeters (mm) in axial direction, but other ranges may also be possible depending on the size of rotor body 112 and slot 122. Balancing weight entry port 142 thus provides space for balancing weights 120 (FIG. 4) to be introduced into balancing weight slot 122 in the same manner as the original entry port 126, but provides rounded corners 236 that act to reduce the creation of cracks in rotor body 112 during subsequent use. Rounded corners 236 may have a radius, for example, in a range of 1.250 millimeters (mm) to 5.080 mm.

Figure 12:
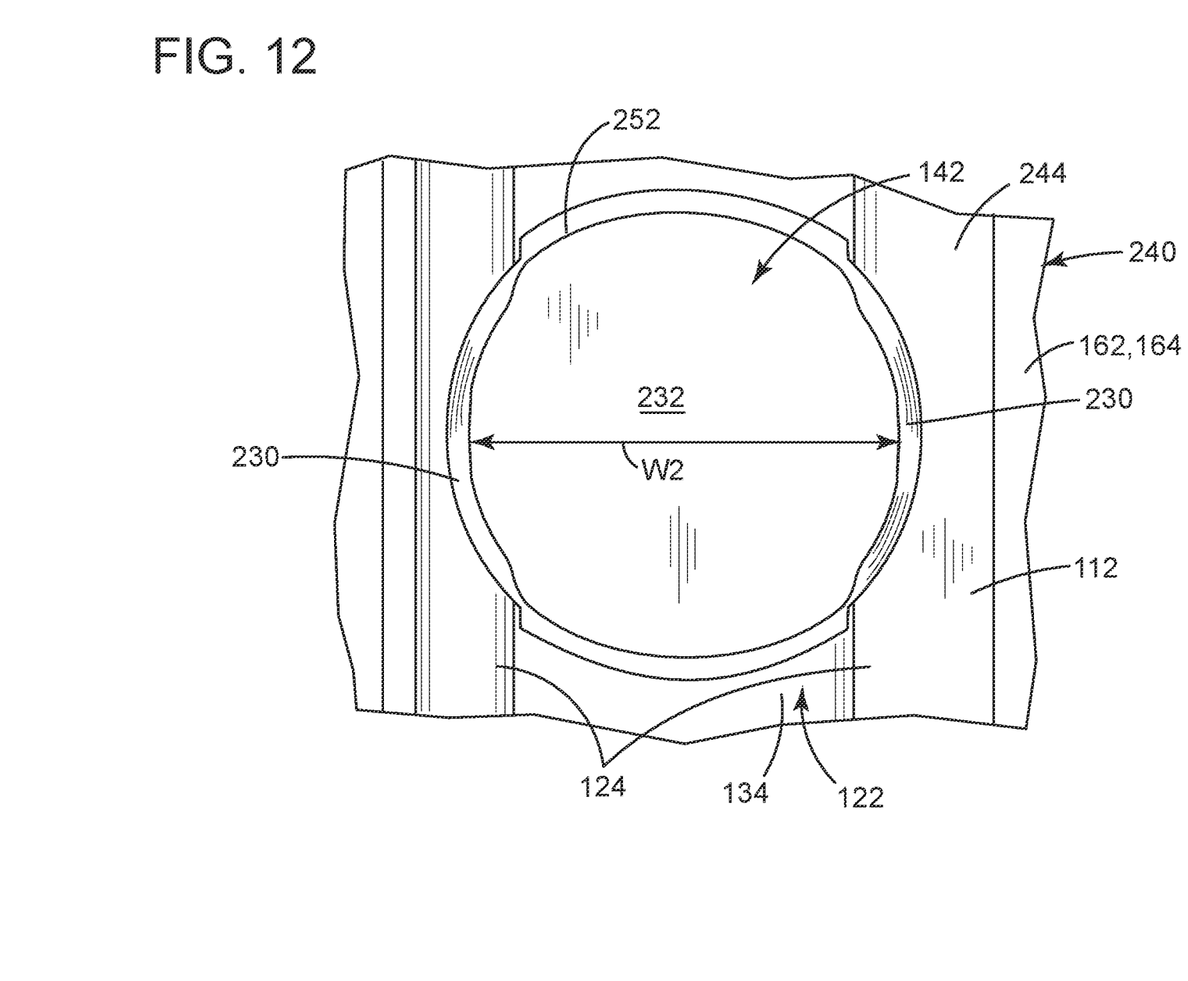
FIG. 12 is a top down view of a balancing weight entry port, according to embodiments of the disclosure.

Referring to FIGS. 10-12, a turbine rotor 240 according to embodiments of the disclosure may include rotor body 112, and balancing weight slot 122 defined in an exterior circumference 244 of rotor body 112. As shown in FIG. 11, balancing weight slot 122 has an axial width W3 and first radially outward facing surface 134 at first radial distance RD1 from axis A of rotor body 112. Rotor body 112 may include first merge joint flange 162 and second merge joint flange 164 axially coupled to the first merge joint flange 162 at a rotor flange interface 250 (FIG. 10). Balancing weight slot 122 may be axially adjacent rotor flange interface 250; however other locations are also possible.

Turbine rotor 240 also includes balancing weight entry port 142 defined in a portion of exterior circumference 244 of rotor body 112 and aligned with balancing weight slot 122. Balancing weight entry port 142 has axial width W2 that is greater than axial width W3 of slot 122, thus allowing balancing weights 120 (FIG. 4) to be introduced into the slot at the entry port. Balancing weight entry port 142 also includes a radially outward facing surface 232 (FIG. 11) at radial distance RD2 from axis A of rotor body 112 that is smaller than radial distance RD1 of the radially outward facing surface 134 of slot 122. A difference between radial distance RD1 of the slot from axis A of rotor body 112 and radial distance RD2 of entry port 142 from axis A of rotor body 112 may be in the range of 0.254 millimeters (mm) to 2.286 mm.

As shown in the top down view of FIG. 12, balancing weight entry port 142 includes an interface 252 between radially outward facing surface 134 of slot 122 and radially outward facing surface 232 of port 142. Interface 252 is rounded, i.e., with the same radius as rounded corners 236 due to the rounded corners 220 (FIG. 9) of machining element 154. Balancing weight slot 122 has a first cross-sectional shape, e.g., trapezoidal, and balancing weight entry port 142 has a cross-sectional shape different than the first cross-sectional shape of the slot e.g., rectangular with rounded corners 236. Balancing weight slot 122 includes sidewalls 229 (FIG. 11) that may extend from radially outward facing surface 134 of the slot at a non-perpendicular angle α. In contrast, balancing weight entry port 142 has sidewalls 228 extending from radially outward facing surface 232 of the port at a perpendicular angle β. As noted, entry port 142 includes rounded corner 236 coupling second radially outward facing surface 232 and sidewalls 228 of the balancing weight entry port. Rounded corner 236 may have a radius in a range of 1.250 millimeters (mm) to 5.080 mm; however, other ranges may be possible depending on size of rotor body 112 and/or slot 122.

Embodiments of the disclosure provide a turbine rotor having an entry port with rounded corners to prevent damage such as cracking. The entry port also extends farther into the rotor body to reduce damage. The method and tool according to embodiments of the disclosure allow formation of the entry port in new or used rotor bodies. Where applied to used rotor bodies, formation of the new entry port can remove damage from the rotor body. The tool and method can be advantageously employed in a manufacturing location or in the field.

The foregoing describes and shows the processing associated according to several embodiments of this disclosure. It should be noted that in some alternative implementations, the acts noted in the drawings or text may occur out of the order noted or, for example, may in fact be executed substantially concurrently or in the reverse order, depending upon the act involved. Also, one of ordinary skill in the art will recognize that additional steps, e.g., machining or finishing steps, may be added.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A tool for forming a balancing weight entry port for a balancing weight slot of a rotor body of a turbine rotor, the tool comprising:
   a motorized machining head;
   a clamp system configured to couple the motorized machining head to at least a portion of a merge joint flange of the rotor body;
   a head circumferential positioning system configured to position the motorized machining head in a selected one of a plurality of circumferential positions relative to the balancing weight slot of the rotor body; and
   a head radial positioning system configured to move the motorized machining head radially relative to the balancing weight slot on the rotor body at each of the plurality of circumferential positions to machine the rotor body, modifying the balancing weight slot,
   wherein the head circumferential positioning system includes:
   a first member fixedly coupled to the motorized machining head and including a position selector; and
   a second member fixedly coupled to the clamp system and including a position selecting member for each of the plurality of circumferential positions, wherein the first member includes a projection that is slidably movable within an opening in the second member to slidably couple the first member to the second member;
   wherein the position selector is configured for positioning the first member relative to the second member in a selected one of the position selecting members of the second member to position the motorized machining head in the selected one of the plurality of circumferential positions relative to the balancing weight slot of the rotor body.

2. The tool of claim 1, wherein the plurality of circumferential positions relative to the balancing weight slot of the rotor body includes at least three positions.

3. The tool of claim 1, wherein the head radial positioning system includes a linear actuator.

4. The tool of claim 1, further comprising at least one tie-down member having a first end configured to mount in the balancing weight slot and a second end coupled to the clamp system.

\* \* \* \* \*

UNITED STATES PATENT AND TRADEMARK OFFICE
CERTIFICATE OF CORRECTION

| | |
|---|---|
| PATENT NO. | : 11,846,201 B2 |
| APPLICATION NO. | : 17/657409 |
| DATED | : December 19, 2023 |
| INVENTOR(S) | : Michael Ericson Friedman et al. |

It is certified that error appears in the above-identified patent and that said Letters Patent is hereby corrected as shown below:

In the Specification

Column 1, Line 6 reads "...now U.S. patent Ser. No. _____, of which the entire..." but it should read "...now U.S. patent Ser. No. 11,377,955, of which the entire..."

Signed and Sealed this
Twentieth Day of August, 2024

Katherine Kelly Vidal
*Director of the United States Patent and Trademark Office*